C. J. McTIGHE.
TRUCK BODY TILTING OR DUMPING DEVICE.
APPLICATION FILED JUNE 17, 1919.

1,387,423.

Patented Aug. 9, 1921.
2 SHEETS—SHEET 1.

C. J. McTighe,
Inventor

By Geo. P. Kimmel
Attorney

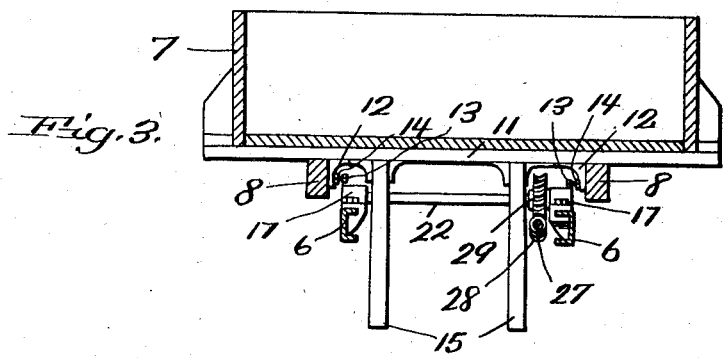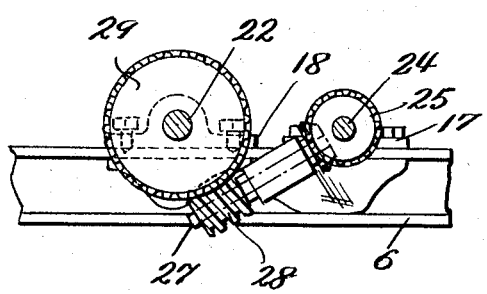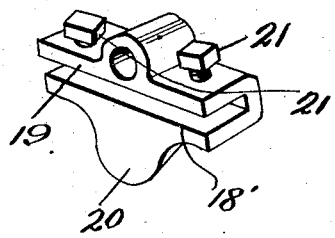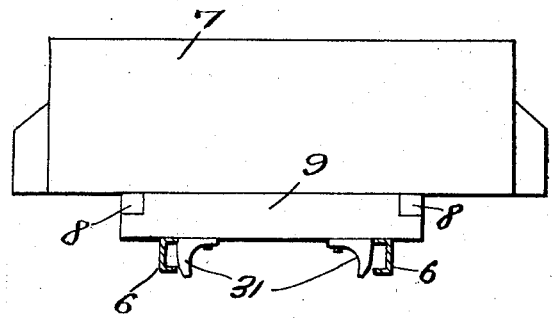

UNITED STATES PATENT OFFICE.

CUMIAN J. McTIGHE, OF CEDAR CANYON, SOUTH DAKOTA.

TRUCK-BODY TILTING OR DUMPING DEVICE.

1,387,423. Specification of Letters Patent. Patented Aug. 9, 1921.

Application filed June 17, 1919. Serial No. 304,760.

*To all whom it may concern:*

Be it known that I, CUMIAN J. McTIGHE, a citizen of the United States, residing at Cedar Canyon, in the county of Meade and State of South Dakota, have invented certain new and useful Improvements in Truck-Body Tilting or Dumping Devices, of which the following is a specification.

The invention relates to a truck body tilting or dumping device, adapted especially for use on Ford motor vehicles.

The primary object of the invention is the provision of a device of this character, wherein a truck body or box can be readily mounted upon the chassis of a motor vehicle for the dumping of the body or box, the device being of novel form and in the mounting thereof the body may be moved forwardly or backwardly upon the chassis to the desired degree for assuring the requisite tilting action or the proper elevation of the body or box as the occasion may require.

Another object of the invention is the provision of a device of this character wherein the operating mechanism is of a character so that when the body or box is raised it will be retained in that position until changed by an operator after the load has been dumped and also the said body or box can be brought to normal position, the actuating mechanism being designed to serve as a lock.

A further object of the invention is the provision of a device of this character, wherein the actuating mechanism may be operated from either side of a truck, the device being entirely without the body or box to assure full and maximum loading capacity, while the body or box together with the device may be mounted upon trucks having frames with little or no overhang.

A still further object of the invention is the provision of a device of this character, which is comparatively simple in construction, very reliable and efficient in its operation, readily and easily applied to the chassis of a motor truck, strong, durable and inexpensive to manufacture and install.

With these and other objects, the invention consists of the features of construction, combination and arrangement of parts, as will be hereinafter fully described, illustrated in the accompanying drawings, and pointed out in the claim hereunto appended.

In the accompanying drawings:

Fig. 3 is a vertical transverse sectional view taken approximately on the line 3—3 of Fig. 1.

Fig. 4 is a fragmentary sectional view taken longitudinally approximately on the line 4—4 of Fig. 2.

Fig. 5 is a front elevation of the body or box and frame looking toward the forward end thereof and showing in detail the guide.

Fig. 6 is a perspective view of one of the adjustable side castings.

Similar reference characters indicate corresponding parts throughout the several views in the drawings.

Figure 1:
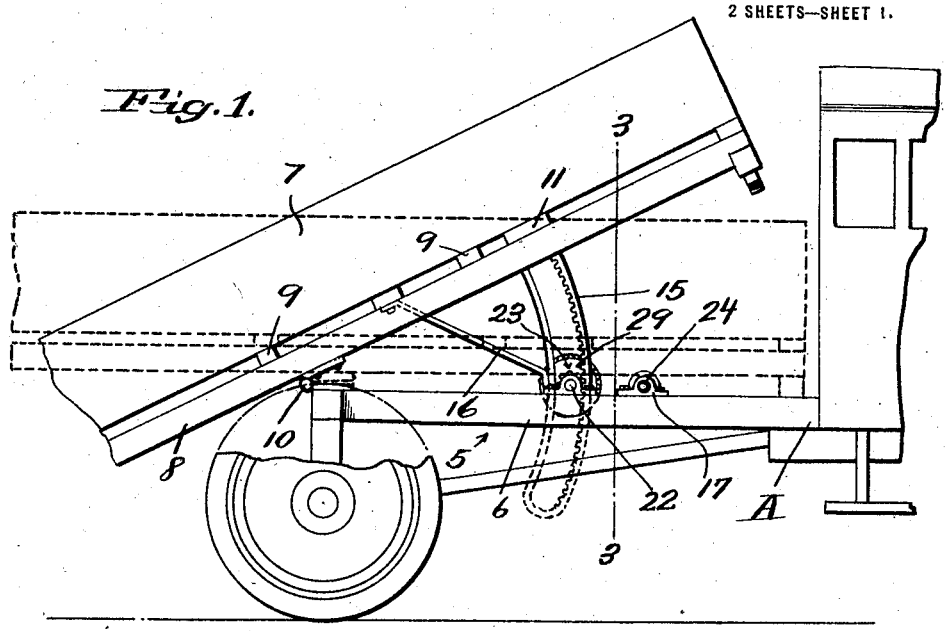
Figure 1 is a side elevation of a motor truck of the Ford type, showing the dumping body or box with the device constructed in accordance with the invention, the dumping body or box being shown in dotted lines in normal loading position and by full lines in elevated or raised position for dumping.
Figure 2:
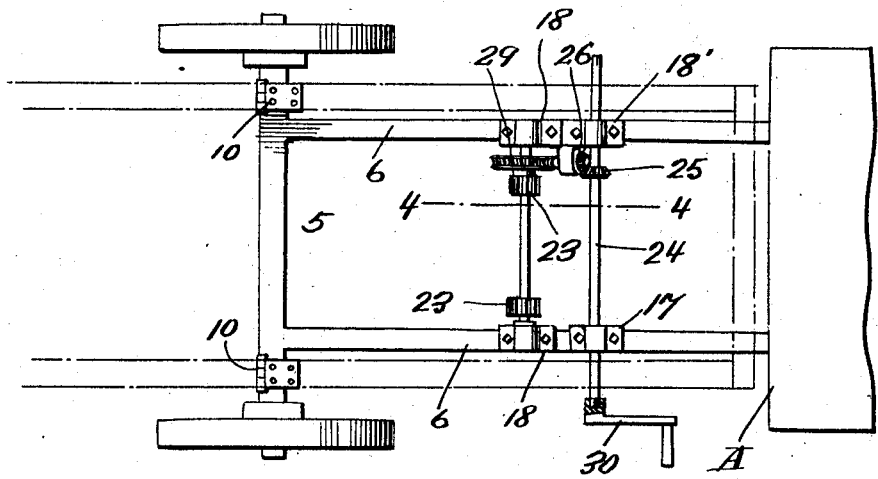
Fig. 2 is a fragmentary plan view with the body removed.

Referring to the drawings in detail A designates generally the wheeled truck of the motor vehicle type, in this instance of the Ford design, having its chassis including spaced parallel longitudinally disposed U-shaped side sills 6 as usual.

Supported upon the chassis 5 is the dumping body or box 7 carried on a bed including the spaced parallel longitudinally disposed side pieces 8 and intermediate and end cross pieces 9, which are bolted or otherwise fastened to the side pieces 8 to form the rigid bed or bottom frame for the body or box as will be apparent.

Suitably and detachably bolted or otherwise secured to the rear end of the side sill 6 of the chassis 5 are the leaves of a pair of hinges 10, the other leaves of which are bolted or otherwise secured to the side pieces 8 of the bed or bottom frame of the body or box 7 and in this manner the latter is swingingly connected with the truck A for the dumping of said body or box by means of the tilting device hereinafter fully described.

The tilting device comprises a cross beam or bar 11 which is arranged transversely between the bottom or box 7 and the side pieces 8 of its bed or frame. The bar or beam 11 is fitted with angle iron brackets 12, which are bolted or otherwise fastened to the bar or beam and carry set screws 13 which are provided with lock nuts 14, the screws 13 being adapted to engage in the side pieces 8 of the bed or frame for the body or box 7 and in this manner the bar or beam 11 is adjustably fastened in said bed or frame so that it can be moved longitudinally upon the side pieces 8 toward or away from the pivot axis of the dumping body or box 7 for a purpose hereinafter fully described.

Secured to and depending from the beam or bar 11 is a pair of spaced slightly curved looplike racks 15, to which are connected inclined braces 16, the same being detachably fastened to the bed or frame of the body or box 7 and in this manner the racks 15 are rigidly held.

Adjustably mounted on the side sills 6 of the chassis 5 are pairs of bearings 17 and 18 respectively, each being in the form of a casting providing a bearing sleeve 18' having the base flange 19 and a jaw 20 hung under the base flange 19, the latter being fitted with set screws 21. These bearings 17 and 18 are adjustably engaged on the side sills 6 and are fastened in adjusted position by the set screws 21, each bearing having its base flange 19 resting upon the upper flange on the U-shaped sill 6 while the jaw 20 extends beneath the said upper flange and rests against the upper flange thereof, while the set screws 21 bite into the said upper flange and thereby fasten the bearings to the sill.

Journaled in the bearings 18 is a driven shaft 22 having fixed thereon rack gears 23, each meshing with the rack teeth of its companion rack 15, while journaled in the bearings 17 is a driving shaft 24 the same being fitted with a beveled gear 25 in mesh with a beveled pinion 26 fixed to the forward end of a counter shaft 27 suitably supported from the adjacent side sill 6 of the chassis 5 and the opposite end of this counter shaft 27 has thereon a worm screw 28 meshing with a worm gear 29 fixed to the driven shaft 22. The shaft 24 extends beyond opposite sides of the chassis 5 of the truck A and on either end thereof is adapted to be detachably fitted a hand crank 30 so that the shaft 24 can be manually turned by an operator when standing at either side of the truck. However it is to be understood that it is contemplated within the scope of this invention the said shaft 24 may be operated in any suitable manner directly from the motor of the truck A.

At the forward ends of the side pieces 8 of the bed or frame of the body or box 7, preferably mounted upon the front cross piece 9 are angle guide blocks 31 which are adapted to engage the side sills 6 of the chassis 5 when the bed or bottom frame of the body or box 7 is in normal lowered position to hold the said body or box in alinement with the chassis of the truck A.

In the operation of the tilting device, it will be apparent that by turning the shaft 24 motion will be imparted to the rack gears 23 and these meshing with the racks 15 will effect the raising of the forward end of the body or box 7 to elevate it for the dumping of the contents thereof. On reverse movement of the shaft 24 the body or box 7 will be automatically lowered to normal position for receiving a load. The employment of the worm screw 28 and worm gear 29 enables the easy raising of the body or box 7 to any desired height and the body will maintain that position until changed by the operator. After the load has been dumped and the box brought back to normal position the said worm screw 28 and worm gear 29 will act as a brake mechanism by reason of the character of the same.

By reason of the adjustability of the tilting device the body may be moved backwardly or forwardly to a greater or lesser degree, it being understood of course that the hinges 10 are changed accordingly for varying the tilting action and also to permit the proper elevation to be had of the tilting body or box.

From the foregoing it is thought that the construction and manner of operation of the device will be clearly understood and therefore a more extended explanation has been omitted.

It is of course to be understood that changes, variations and modifications may be made in the invention such as come properly within the scope of the appended claim, without departing from the spirit of the invention or sacrificing any of its advantages.

What is claimed is:

The combination with a wheeled truck frame having channeled side sills, of a tilting body having a part provided with slots in its sides, means pivotally securing the tilting body on the truck frame, lifting rack depending from the body forwardly of its axis of movement and having a cross-piece adjustably engaged in the slots in the bed of said body to permit variable changing of the rack, pairs of bearings each having a companion base flange and jaw for engagement with the channeled sill of the truck frame, set screws carried by the base flanges of said bearings for locking the latter in adjusted position on the channeled sill of the truck frame, a transmission shaft journaled in one pair of bearings and having pinions meshed with the racks, a power shaft journaled in the other pair of bearings and having gear connection with the transmission shaft and a hand crank engageable with either end of the power shaft at opposite sides of the truck frame.

In testimony whereof, I affix my signature hereto.

CUMIAN J. McTIGHE.